United States Patent
Gormley (10) Patent No.: US 9,976,516 B2
(45) Date of Patent: May 22, 2018

(54) THRUST REVERSER FOR A TURBOFAN ENGINE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 431 days.

(21) Appl. No.: 14/222,182

(22) Filed: Mar. 21, 2014

(65) Prior Publication Data

US 2015/0267641 A1   Sep. 24, 2015

(51) Int. Cl.
*F02K 1/72* (2006.01)
*F02K 1/80* (2006.01)
*F02K 1/76* (2006.01)

(52) U.S. Cl.
CPC ............... *F02K 1/72* (2013.01); *F02K 1/763* (2013.01); *F02K 1/766* (2013.01); *F02K 1/80* (2013.01)

(58) Field of Classification Search
CPC ... F02K 1/70; F02K 1/72; F02K 1/763; F02K 1/766; F02K 1/62; F02K 1/625
See application file for complete search history.

(56) References Cited

U.S. PATENT DOCUMENTS

| | | | |
|---|---|---|---|
| 3,612,209 A * | 10/1971 | Vdoviak | F02K 1/1269 181/211 |
| 4,275,560 A | 6/1981 | Wright et al. | |
| 4,807,434 A * | 2/1989 | Jurich | F02K 1/72 239/265.29 |
| 4,909,442 A | 3/1990 | Fernz | |
| 5,046,307 A | 9/1991 | Matta et al. | |
| 6,474,059 B2 | 11/2002 | Stretton | |
| 6,845,946 B2 | 1/2005 | Lair | |
| 6,976,352 B2 * | 12/2005 | Lair | F02K 1/763 239/265.25 |
| 7,559,507 B2 | 7/2009 | Harrison et al. | |
| 7,600,371 B2 | 10/2009 | Sternberger | |
| 7,690,190 B2 | 4/2010 | Thornock et al. | |
| 8,109,467 B2 | 2/2012 | Murphy | |
| 8,256,204 B2 | 9/2012 | Hatrick | |
| 2008/0246421 A1 * | 10/2008 | Harvey | F02K 1/763 318/14 |
| 2013/0280052 A1 | 10/2013 | Gonidec et al. | |

OTHER PUBLICATIONS

Search report for FR1552324 dated Dec. 1, 2017.

\* cited by examiner

*Primary Examiner* — Andrew Nguyen
(74) *Attorney, Agent, or Firm* — O'Shea Getz P.C.

(57) ABSTRACT

A thrust reverser of a turbofan engine has a translating structure and a blocker door device capable of diverting a bypass flowpath for reversing propulsion direction. The translating structure moves axially between a forward position and a rearward position and thereby drives a compound motion of a blocker door of the blocker door device that moves between respective stowed and deployed states. A passive linkage of the blocker door device is orientated between a stationary structure and the blocker door and may be utilized in combination with an extendable linkage that may be orientated between the blocker door and the stationary structure.

10 Claims, 7 Drawing Sheets

THRUST REVERSER FOR A TURBOFAN ENGINE

BACKGROUND

The present disclosure relates to a thrust reverser for a turbofan engine and more particularly to a blocker door device of the thrust reverser.

Turbofan engines are known to include a fan section that produces a bypass airflow for providing the majority of engine propulsion and a combustion or core airflow for compression, mixing with fuel, combustion and expansion through a turbine to drive the fan section. The engines further include nacelles that partially surround the core of the engine, include a pylon for securing the engine to a structure such as an aircraft wing, and provide an annular bypass airflow duct for directing the bypass airflow in a rearward direction to produce forward propulsion. The nacelles may further include thrust reversers capable of redirecting the bypass airflow from the rearward direction to, at least partially, a forward direction thus producing a rearward propulsion. As an example, such rearward propulsion may serve to decelerate the forward motion of an aircraft soon after landing.

Thrust reversers may include a plurality of blocker doors physically capable of changing positions through mechanical and hydraulic linkages from a stowed position for forward propulsion and to a deployed position for rearward propulsion. There exists a need to improve such linkages and reduce linkage obstruction in the bypass airflow duct.

SUMMARY

A thrust reverser according to one, non-limiting, embodiment of the present disclosure includes a translating structure constructed and arranged to move between first and second positions; a blocker door pivotally engaged to the translating structure for pivotal movement between a first state when the translating structure is in the first position and a second state when the translating structure is in the second position; a stationary structure; and a telescoping push rod engaged pivotally to and extending between the stationary structure and the blocker door for telescopic movement between retracted and extended conditions when the blocker door moves between the respective first and second states.

Additionally to the foregoing embodiment, the thrust reverser includes a linkage orientated between the stationary structure and the blocker door.

In the alternative or additionally thereto, in the foregoing embodiment, the telescoping push rod has a biasing member for biasing the telescoping push rod toward the extended condition.

In the alternative or additionally thereto, in the foregoing embodiment, the telescoping push rod is in the extended condition when the blocker door is in the second state.

In the alternative or additionally thereto, in the foregoing embodiment, the blocker door has an intermediate state orientated between the first and second states and the telescoping push rod is in the extended condition when the blocker door pivots between the intermediate state and the second state.

In the alternative or additionally thereto, in the foregoing embodiment, the telescoping push rod is in the retracted condition when the blocker door is in the first state, and is extending from the retracted condition and into the extended condition when the blocker door is pivoting from the respective first state and into the intermediate state.

In the alternative or additionally thereto, in the foregoing embodiment, the push rod includes a stop preventing further extension of the push rod.

In the alternative or additionally thereto, in the foregoing embodiment, the thrust reverser includes a linkage orientated between the stationary structure and the blocker door; and the blocker door has an intermediate state orientated between the first and second states and the telescoping push rod is in the extended condition when the blocker door pivots between the intermediate state and the second state, and the telescoping push rod is in the retracted condition when the blocker door is in the first state and is extending from the retracted condition and into the extended condition when the blocker door is pivoting from the respective first state and into the intermediate state, and wherein the biasing member exerts a biasing force against the stop when the telescoping push rod is in the extended condition and exerts a component of the biasing force upon the linkage when the blocker door is at or between the first state and the intermediate state.

In the alternative or additionally thereto, in the foregoing embodiment, the telescoping push rod includes first and second arms co-extending along a centerline and in sliding engagement with one another, and a first pivotal joint engaged to the stationary structure and the first rod and a second pivotal joint engaged to the blocker door and the second arm, and wherein the resilient member is a coiled spring compressed between an axial face carried by the first arm and an opposed axial face carried by the second arm.

A blocker door device for a thrust reverser having a translating structure, according to another, non-limiting, embodiment includes a stationary structure; a blocker door pivotally engaged to the translating structure; a passive linkage orientated between the stationary structure and the blocker door; and an extendable linkage engaged between the stationary structure and the blocker door.

Additionally to the foregoing embodiment, the extendable linkage is pivotally engaged between the stationary structure and the blocker door.

In the alternative or additionally thereto, in the foregoing embodiment, the blocker door has a first surface and an opposite second surface and the extendable linkage is orientated between the stationary structure and the first surface and the passive linkage is orientated between the stationary structure and the second surface.

In the alternative or additionally thereto, in the foregoing embodiment, the extendable linkage is a telescoping push rod and the passive linkage has an arm rigidly engaged to and projecting outward from the second surface and to a distal head for contact upon the stationary structure.

In the alternative or additionally thereto, in the foregoing embodiment, the extendable linkage has a resilient biasing member for biasing the extendable linkage from a retracted condition and toward an extended condition.

In the alternative or additionally thereto, in the foregoing embodiment, the blocker door pivots between a stowed state and a deployed state, and when in the stowed state the extendable linkage is in the retracted condition and the distal head is in contact with the stationary structure, and when in the deployed state the extendable linkage is in the extended condition and the distal head is spaced from the stationary structure.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
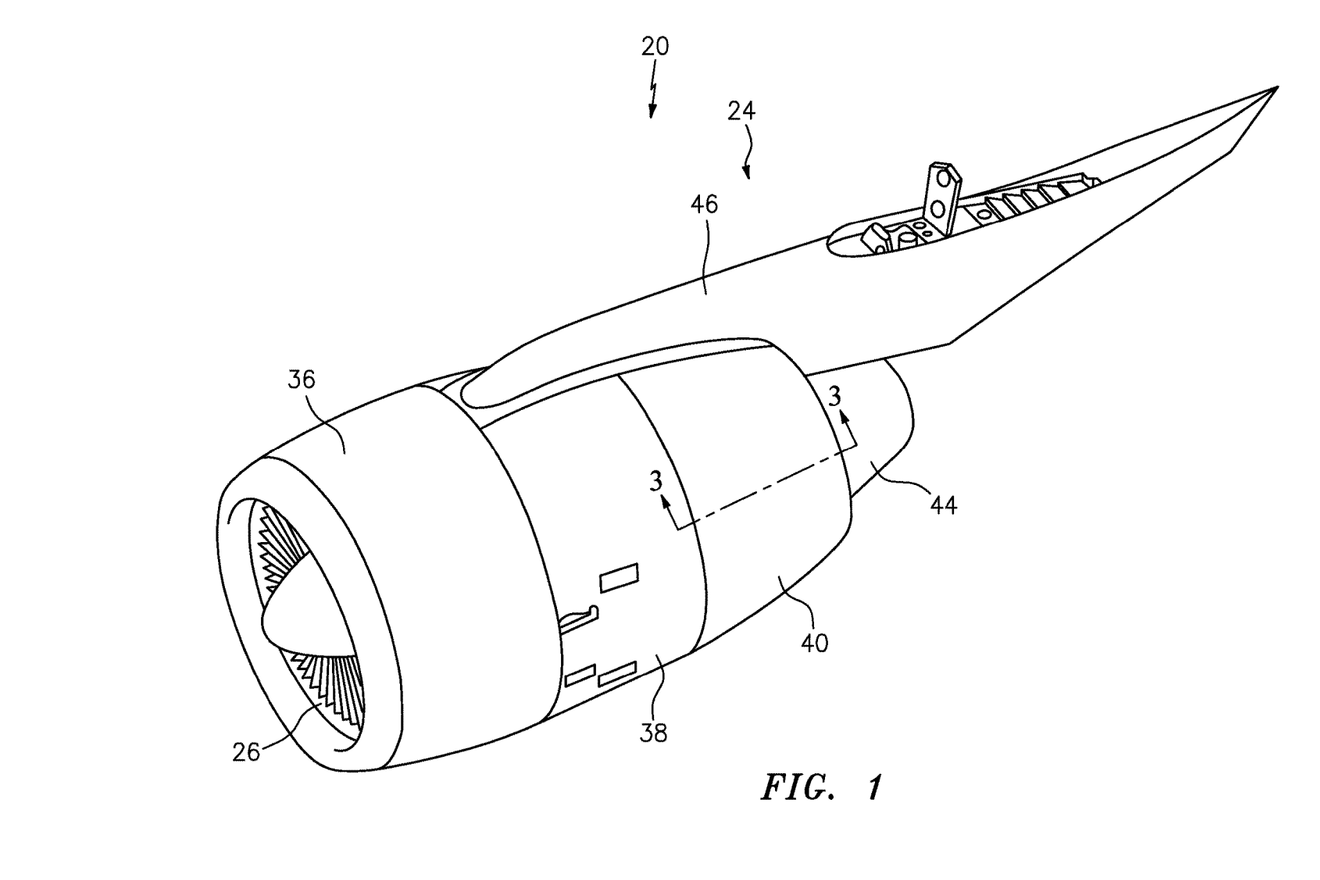
FIG. 1 is a perspective view of a turbofan engine according to one non-limiting embodiment of the present disclosure.
Figure 2:
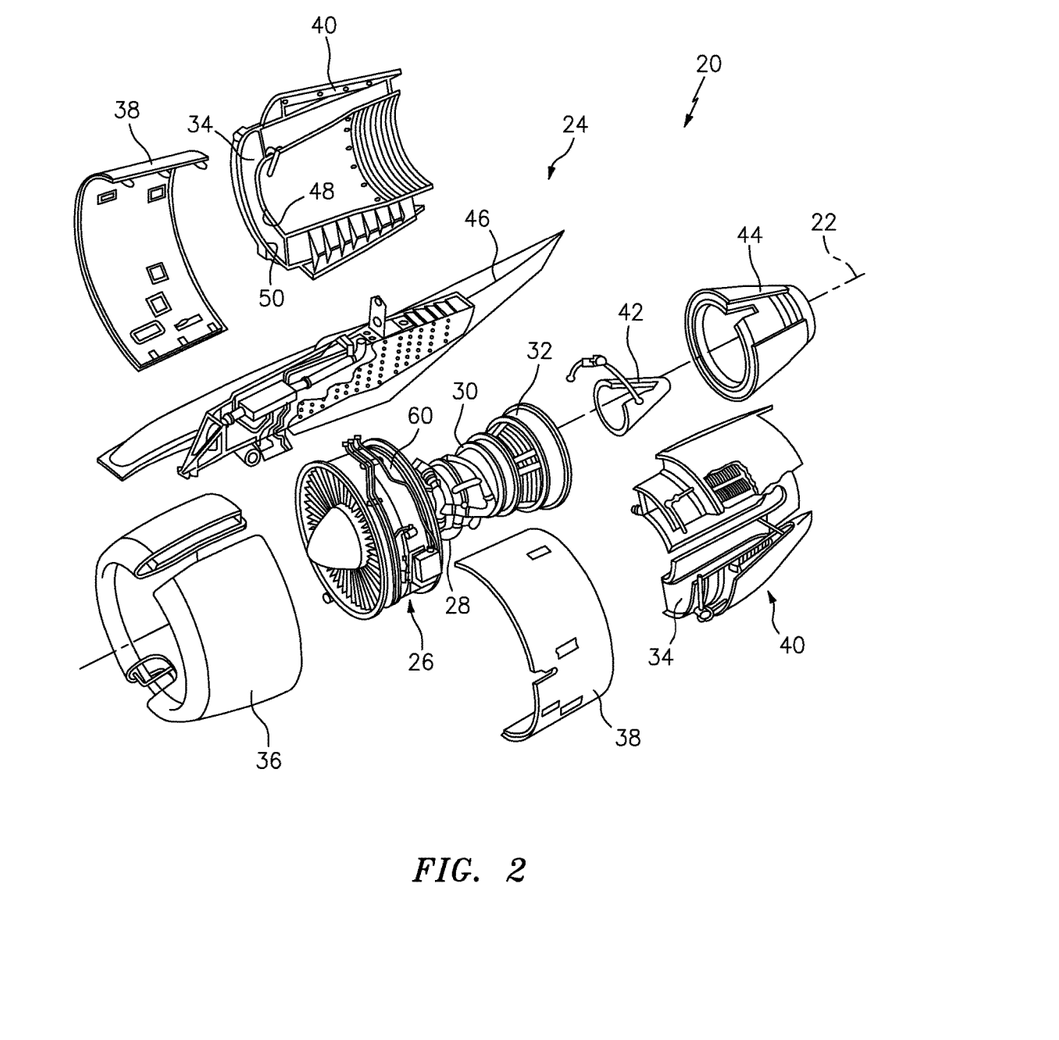
FIG. 2 is an exploded view of the turbofan engine.

Referring to FIGS. 1 and 2, a turbofan engine 20 is centered about an axis 22 and includes a nacelle 24 that supports and generally surrounds an inner engine core that includes a fan section 26, a compressor section 28, a combustor section 30 and a turbine section 32. The fan section 26 drives air along a bypass flowpath or duct 34 and the combustor section 30 receives a portion of air from the fan section 26 and drives air along a core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios and that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround the compressor, combustor and turbine sections 28, 30, 32, an exhaust centerbody 42 aft of the turbine section 32, an exhaust nozzle 44 that is spaced radially outward from the exhaust centerbody 42, and a pylon 46 that supports the engine 20 typically to an undercarriage of an aircraft wing (not shown).

Figure 3:
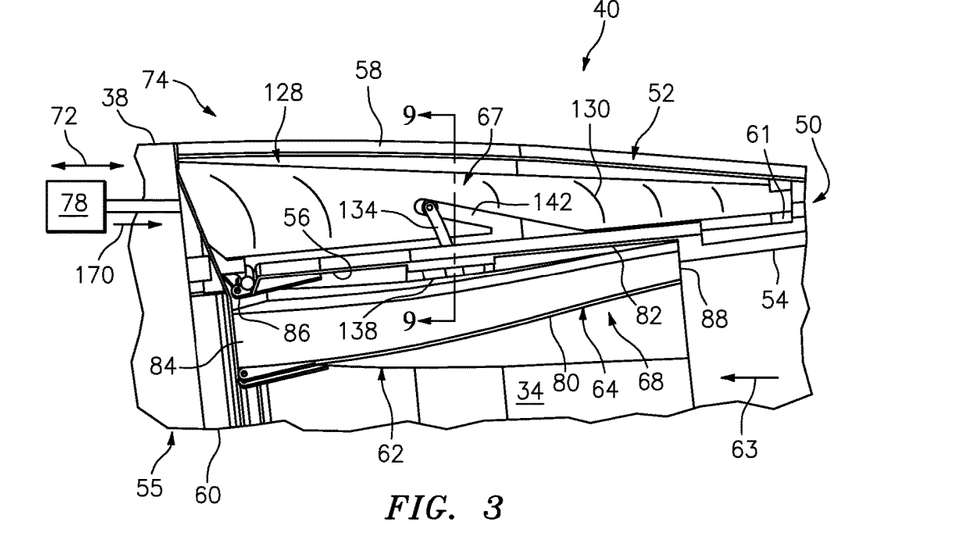
FIG. 3 is a partial cross section of a thrust reverser being stowed and illustrating a passive linkage being engaged, a blocker door in a stowed state, and a translating structure in a forward position, with portions removed to show detail, and taken along line 3-3 of FIG. 1.

Referring to FIGS. 2 and 3, the thrust reverser 40 generally has a radially inner shell 48 and a translating outer shell 50 spaced radially outward from the inner shell 48. The bypass flowpath 34 is defined by and located radially between the inner and outer shells 48, 50; may be generally annular in shape; and, may be located immediately downstream of the fan section 26. The outer shell 50 may have a forward section or translating structure 52 and an aft section 54 with both being generally cylindrical and concentric to the engine axis 22. The aft section 54 may translate with the translating structure 52, or in some examples, may be fixed and stationary with respect to the inner shell 48 and/or pylon 46. The translating structure 52 may include a pressure sleeve 56 and an outer casing 58 generally spaced radially outward from the pressure sleeve 56. The pressure sleeve 56 spans axially between a forward portion 60 of the stationary structure 55 such as, for example, a cylindrical fan housing of the fan section 26 and an aft portion of the stationary structure 55 such as, for example, a cascade ring 61 of the stationary structure 55 during normal forward propulsion of, for example, an aircraft. Moreover, the outer casing 58 of the forward section 52 may span axially rearward from the fan cowl 38. The pressure sleeve 56 and the outer casing 58 both span axially rearward and join to one-another at a point that may be generally located radially inward and aft of the cascade ring 61. That is, a cross-section of the translating structure 52 resembles a horse-shoe that is open in the forward direction (see arrow 63 in FIG. 3) with respect to forward propulsion of the engine 20.

Figure 4:
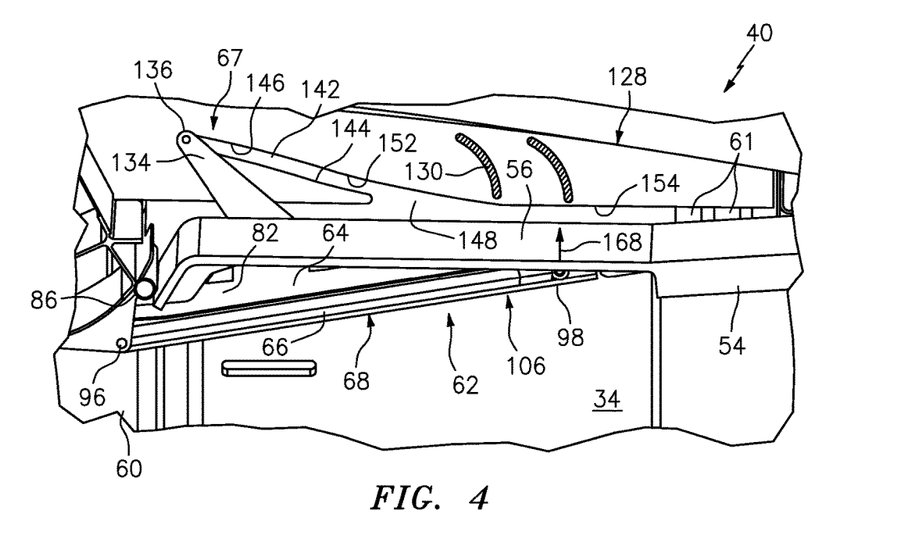
FIG. 4 is a partial cross section of the thrust reverser similar to FIG. 3 but also illustrating an extendable linkage in a retracted condition.
Figure 5:
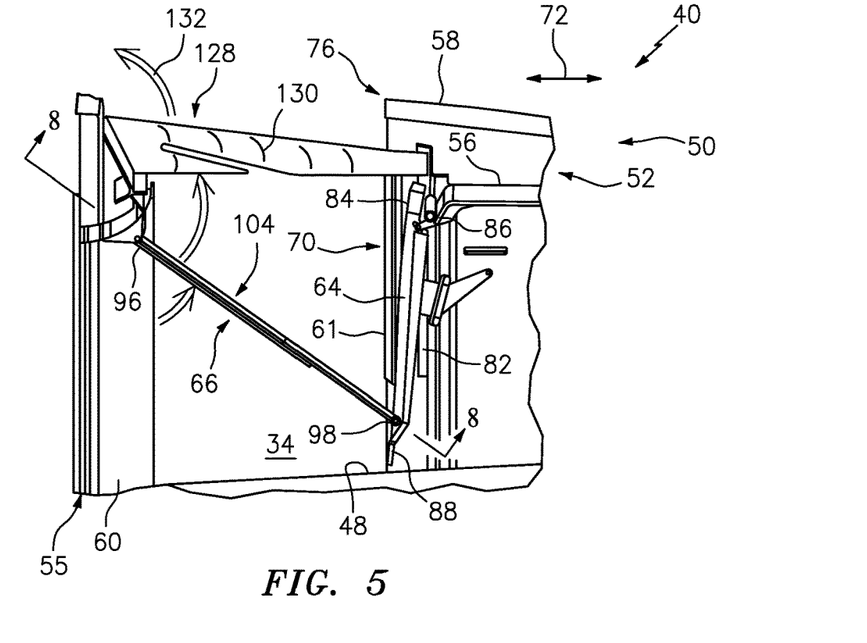
FIG. 5 is a partial cross section of the thrust reverser being deployed and illustrating the passive linkage being disengaged, the blocker door in a deployed state, the translating structure in an aft position, and the extendable linkage in an extended condition.

Referring to FIGS. 3 through 5, a plurality of blocker door devices 62 of the thrust reverser 40 are distributed circumferentially about the engine axis 22. Each device 62 has a blocker door 64, a dynamic or extendable linkage 66, and a disengagable passive linkage 67. The linkage 67 is termed 'passive' in the sense that it does not bend in, bend out, extend in, or retract out upon itself. The extendable linkage 66 is generally located radially inward of the pressure sleeve 56 of the translating structure 52 and spans axially between the fan housing 60 and the blocker door 64 during forward propulsion of the engine 20. The passive linkage 67 is engaged and generally located radially between the blocker door 64 and the outer casing 58 of the translating structure 52 during forward engine propulsion. The blocker door 64 and the translating structure 52 are both capable of coincidental movement relative to the cascade ring 61 of the stationary structure 55, thereby re-directing bypass airflow in the bypass flowpath 34 that may generally change aircraft power between forward propulsion and reverse propulsion.

Figure 6:
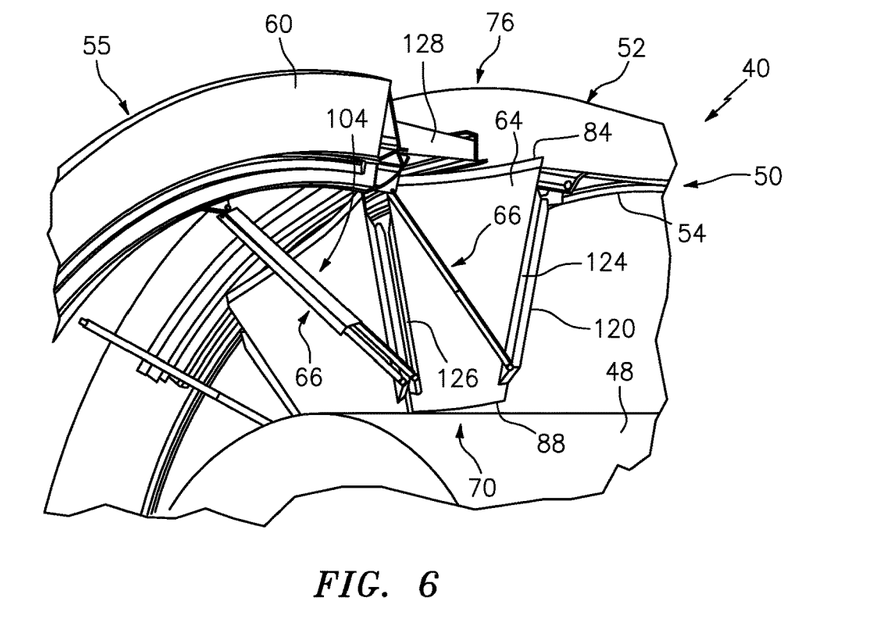
FIG. 6 is a partial perspective view of the deployed thrust reverser with portions removed to show internal detail.

Each blocker door device 62 further includes a dynamic or extendable linkage 66 capable of providing door stability and at least partial guiding movement of the blocker door 64 between a stowed state 68 (see FIGS. 3 and 4) for forward aircraft propulsion and a deployed state 70 (see FIGS. 5 and 6) for reverse or rearward aircraft propulsion. It is further contemplated and understood that the extendable linkage 66 does not obstruct the bypass flowpath 34 when the blocker door 64 is in the stowed state 68 (i.e. does not include a drag link).

The translating structure 52 of the outer shell 50 is driven substantially in an axial direction (see arrow 72), between a forward position 74 (see FIG. 3), placing the blocker door 64 in the stowed state 68, and an aft position 76 (see FIGS. 5 and 6) placing the blocker door 64 in the deployed state 70. When in the forward position 74, the translating structure 52 may be substantially axially aligned to, and located radially outward from, the stowed blocker door 64. When in the aft position 76, the translating structure 52 may be substantially, axially, rearward to (i.e. aft of) the blocker door 64; axially aligned to the cascade ring 61; and, located substantially radially outward from the blocker door 64.

Referring to FIG. 3, at least one master actuator 78 of the thrust reverser 40 powers the axial movement of the translating structure 52 and may (as non-limiting examples) be hydraulically or electrically actuated or a combination of both. The actuator 78 may have a drive unit secured rigidly to the fan housing 60 of the stationary structure 55 and a hydraulic arm linked to the translating structure 52 and capable of being extended and retracted from the drive unit. The actuator 78 may be described as a 'master' and the extendable linkage 66 may be described as a 'slave linkage' in the sense that the actuation of linkage 66 is directly dependent upon the driven motion of the translating structure 52. That is, without substantially linear motion (e.g. axial motion) of structure 52, the extendable linkage 66 may not move.

Figure 7:
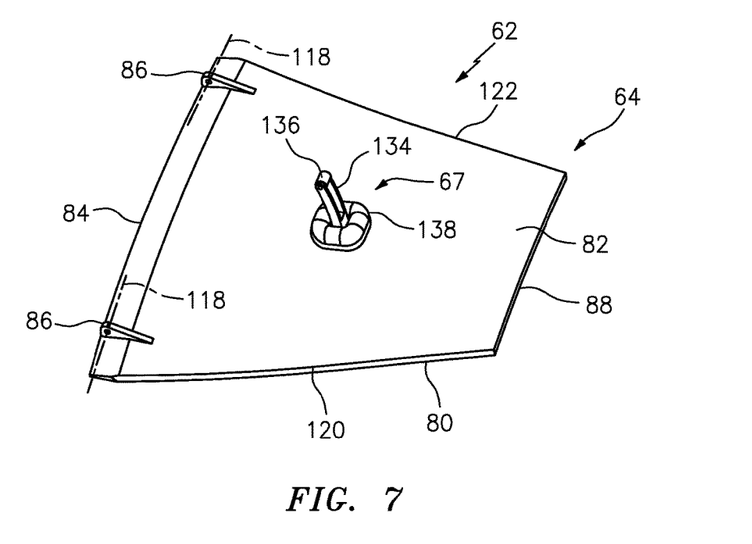
FIG. 7 is a perspective view of a blocker door.

Referring to FIG. 7, the blocker door 64 has an exposed surface 80 that defines in-part the bypass flowpath 34 and an opposite surface 82 that faces radially outward and toward the pressure sleeve 56 when the blocker door 64 is in the stowed state 68 (see FIG. 4). When in the deployed state 70 (see FIG. 5), the surface 82 of the blocker door 64 may face in a substantially, axial, downstream direction. The blocker door 64 further has and extends between a base or edge portion 84 attached to a forward end of the pressure sleeve 56 of the translating structure 52 by at least one pivotal connection 86 (two connections illustrated as a non-limiting example), and an opposite distal edge 88. When in the stowed state 68, the edge portion 84 may be proximate to a rearward edge of the fan housing 60 of the stationary structure 55 and the distal edge 88 may be proximate to a forward edge of the aft section 54 of the outer shell 50. Similarly, and when in the stowed state 68, a forward edge of the pressure sleeve 56 of the translating structure 52 may be releasably sealed to the rearward edge of the fan housing 60 and a forward edge of the outer casing 58 of the translating structure 52 is proximate to a rearward edge or portion of the fan cowl 38. When in the deployed state 70, the blocker door 64 extends substantially radially; the edge portion 84 of the door 64 remains pivotally engaged to the pressure sleeve 56, and the distal edge 88 may be proximate to the inner shell 48.

Figure 8:
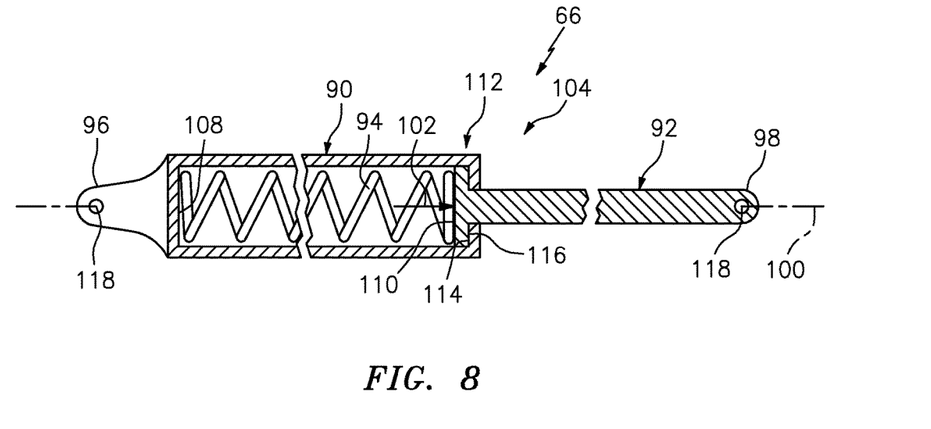
FIG. 8 is a cross section of the extendable linkage and taken along line 8-8 of FIG. 5.

Referring to FIG. 8, one non-limiting example of the dynamic or extendable linkage 66 may be a telescoping push rod. The push rod 66 may include first and second elongated arms 90, 92, a resilient biasing member 94 and opposite pivotal joints 96, 98. The first and second arms 90, 92 co-extend longitudinally and are in an extendable or telescoping relationship to one-another along a centerline 100. The biasing member 94 exerts a force (see arrow 102) that biases the push rod 66 toward a fully extended condition 104 (see FIGS. 5 and 8) and away from a fully retracted condition 106 (see FIG. 4). The first arm 90 may be a tube having a base end connected to the pivotal joint 96 and an opposite distal end that is open for axial receipt of the second aim 92. The second arm 92 may have a distal end that is in the tube 90 and an opposite base end that is connected to the pivotal joint 98. The biasing member 94 may be a coiled spring located in the tube 90 and compressed between a first face 108 carried by the tube 90 and facing axially toward the pivotal joint 98, and an opposing second face 110 carried by the second arm 92 and facing axially toward the pivotal joint 96. It is further contemplated and understood that the biasing member 94 may be a pneumatic or hydraulic device or spring.

The push rod 66 may further include a stop 112 having a first contact 114 carried by the tube 90 and a second contact 116 carried by the arm 92. The first contact 114 may be at the distal end of the tube 90 and carried by a rim of the tube that projects radially inward. The second contact 116 may be at or near the distal end of the second arm 92 and carried by an enlarged distal head. It is further contemplated and understood that a substantial portion of the second arm 92 may remain inside and is supported by the tube 90 when the push rod 66 is in the extended condition 104 (i.e. the enlarged distal head may be elongated in the axial direction) for enhancing structural rigidity of the push rod. When the push rod 66 is in the extended condition 104 the contacts 114, 116 of the stop 112 are in biased contact by the resilient force 102 of the biasing member 94.

Referring to FIGS. 5, 7 and 8, the pivotal joint 96 is also connected to the fan housing 60 of the stationary structure 55 and the pivotal joint 98 is connected to the blocker door 64 near the distal edge 88. Orientation of the pivotal connections 86 and the joints 96, 98 is such that their pivotal axes 118 are substantially parallel to one-another (see FIG. 7). Each blocker door device 62 may have one push rod located in the center or two push rods 66 generally located along opposite edges 120, 122 of the blocker door 64 (see FIG. 7), with each edge 120, 122 extending between the edge portion 84 and the distal edge 88 of the blocker door 64. To further enhance aerodynamic efficiency of flow through the bypass flowpath 34 when the reverse thruster 40 is stowed, the exposed surface 80 of the blocker door 64 may define recesses 124, 126 (see FIG. 6) that extend along the respective edges 120, 122 for substantial storage of the respective push rods 66 when the blocker door 64 is in the stowed state 68 and the push rods 66 are in the retracted condition 106 (see FIG. 4). That is, no substantial portion of the push rod 66 extends across or otherwise substantially obstructs bypass airflow during forward engine propulsion, thus airflow efficiency is not reduced during normal flight operating conditions and noise is minimized.

Referring to FIGS. 3 through 5, the stationary structure 55 may include a stationary member 128 that may have at least one turning vane 130 that functions to further divert bypass air flow (see arrow 132 in FIG. 5) from a downstream direction to, at least in-part, an upstream direction when the blocker door 64 is in the deployed state 70. The cascade member 128 may be generally cylindrical and concentric to the engine axis 22, and spans axially between the fan housing 60 and the cascade ring 61 of the stationary structure 55. Because the member 128 may be rigidly secured to the fan housing 60 and/or the cascade ring 61, the member remains stationary. Therefore, when the translating structure 52 of the outer shell 50 is in the forward position 74 (see FIG. 3), the stationary member 128 is generally stored between the pressure sleeve 56 and the casing 58 of the translating structure 52 and the turning vanes 130, supported by the member 128, are therefore generally non-functional.

When the translating structure 52 is in the aft position 76 (see FIG. 5), the stationary member 128 is generally exposed to, or is in the diverted bypass flowpath and the diverted bypass air may flow through the member 128 and is further diverted by the turning vanes 130 toward the forward direction 63.

Figure 9:
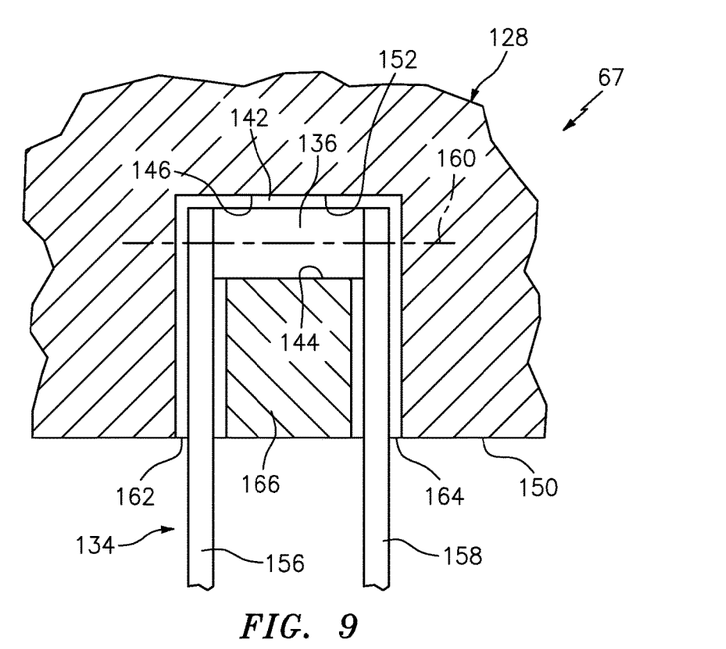
FIG. 9 is a partial cross section of the engaged, passive, linkage taken along line 9-9 of FIG. 3.
Figure 10:
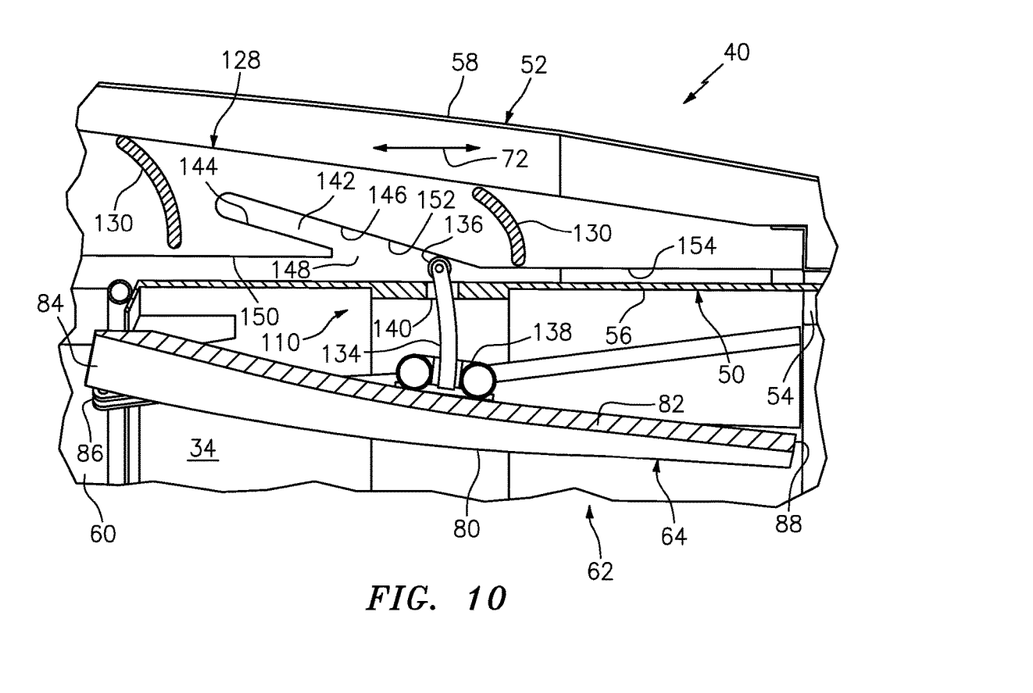
FIG. 10 is a partial cross section of the thrust reverser illustrating the blocker door being between the stowed state and the deployed state.

Referring to FIGS. 4, 7 and 9, the disengagable passive linkage 67 of the blocker door device 62 may be used in conjunction with the telescoping push rod 66 when the blocker door 64 is in or near the stowed state 68 but may not be used (i.e. it is disengaged) when the blocker door 64 is in the deployed state 70. The passive linkage 67 may include: an arm 134 that may project rigidly outward from the surface 82 of the blocker door 64 and to a friction-reducing, distal, head 136; a resilient seal 138 that may be engaged to the surface 82 and surrounds a base of the arm 134; an aperture 140 communicating through the pressure sleeve 56 (also see FIG. 10); a channel 142 in the stationary member 128 and defined between two opposing tracks 144, 146; and an opening 148 in a face 150 of the stationary member 128 that faces radially inward with respect to the engine axis 22 and communicates directly with the channel 142. The channel 142 extends from the opening 148 and angles in an upstream (i.e. forward) and radially outward direction with respect to the engine axis 22. The track 146 has a forward portion 152 that generally extends forward and radially outward from the opening 148 and an aft portion 154 that extends rearward from the opening. The track 144 and the forward portion 152 of the track 146 define the channel 142. The aft portion 154 of the track 146 serves to guide the head 136 in an axial direction and radially inward, and may be an integral and contiguous part of the face 150 of stationary member 128.

Referring to FIG. 9, the arm 134 may be a roller yoke having first and second stanchions 156, 158, and the distal head 136 may be a roller having a rotational axis 160 for rolling contact upon the tracks 144, 146. The roller 136 is disposed between and rotationally supported by distal ends of each stanchion 156, 158. When the blocker door 64 is near or in the stowed state 68, the stanchions 156, 158 are received by respective parallel slots 162, 164 that co-extend axially with the channel 142 and extend laterally between the channel 142 and the face 150 of the stationary member 128. That is, the slots 162, 164 communicate through the face 150 and with the channel 142 and opening 148. The passive linkage 67 may further include a ramp-like projection 166 that carries the first track 144 and is located between and defines in part the two slots 162, 164, and is defined between the first track 144 and the face 150 of the stationary member 128.

The blocker door 64 is capable of 'compound motion' that includes: 1) linear, motion attributable to the door 64 being directly engaged to the translating structure 52, and, 2) rotational or pivotal motion attributable to the pivotal connection 86 and the extendable linkage 66. Furthermore, the blocker door device 62 may be a 'lost motion' device in at least one sense that the translating structure 52 may move a relatively short axial distance rearward when initially moving away from the forward position and before the blocker door 64 begins to pivot away from the stowed state. This lost motion is enabled by the roller 136 staying engaged in the channel 142 and until the pressure sleeve 56 is moved aft and disengages. The channel can have any shape, by making the channel parallel to the engine axis 22 for some distance, the door will not rotate (relative to the pressure sleeve 56) for the length of the parallel section.

During operation and prior to deployment of the thrust reverser 40, the blocker door device is in the stowed position, the translating structure 52 of the outer shell 50 is in the forward position 74, the blocker door 64 is in the stowed state 68, the extendable linkage 66 is in the retracted condition 106 and the passive linkage 67 is generally engaged within the channel 142 (see FIGS. 3 and 4). With the extendable linkage 66 in the retracted condition 106, the linkage extends axially rearward from the pivotal joint 96 and slightly radially outward and the biasing member 94 continues to exert the biasing force 102. Because the actuator 78 is idle and the linkage 66 extends slightly radially outward, a radial component (see arrow 168 in FIGS. 4 and 11) of the biasing force 102 assists in maintaining the blocker door 64 biased into the stowed state 68 against door bumpers or stops (not shown) and until a greater, opposing, force urges the blocker door 64 toward the deployed state 70 (see FIG. 5). When in the stowed state 68, the radial component 168 of the biasing force 102 may assist in compressing the seal 138 against the pressure sleeve 56 and/or the placement of the translating structure 52 into the stowed state 68 by the actuator 78 may force the roller 136 upon the track 144 and with a slight forward roll of the roller 136, compress the seal 138. It is further contemplated and understood that it is generally the angular relationship between the extendable linkage 66 and the pressure sleeve 56 (created essentially by placement and spacing of the joint 96 radially inward of the pivotal connection 86) that provides the radial component of the biasing force 102. Therefore, the radial component of the biasing force may not be solely in a radial direction but may be angled away therefrom and depending upon angular relationships between the push rod 66, the blocker door 64 and the pressure sleeve 56.

During initial deployment of the thrust reverser 40, the actuator 78 exerts a rearward axial force (see arrow 170 in FIG. 3) against the translating member 52. Because this axial force 170 generally exceeds the combined biasing force 102 of the at least one push rod 66, the translating member 52 begins to axially move rearward. The roller 136 of the linkage 67 contacts the forward portion 152 of track 146 and begins to roll the arm 134 rearward urging the blocker door 64 to rotate in a clockwise direction about the pivotal connection 86. The angle of the forward portion 152 of track 146 also causes the arm 134 to begin movement through the aperture 140 and out of the pressure sleeve 56, and the push rod 66 begins to extend out of the retracted condition 106. During this same motion, the extendable linkage or pushrod 66 rotates in a clockwise direction about joint 96 and a counter-clockwise direction about joint 98.

Figure 11:
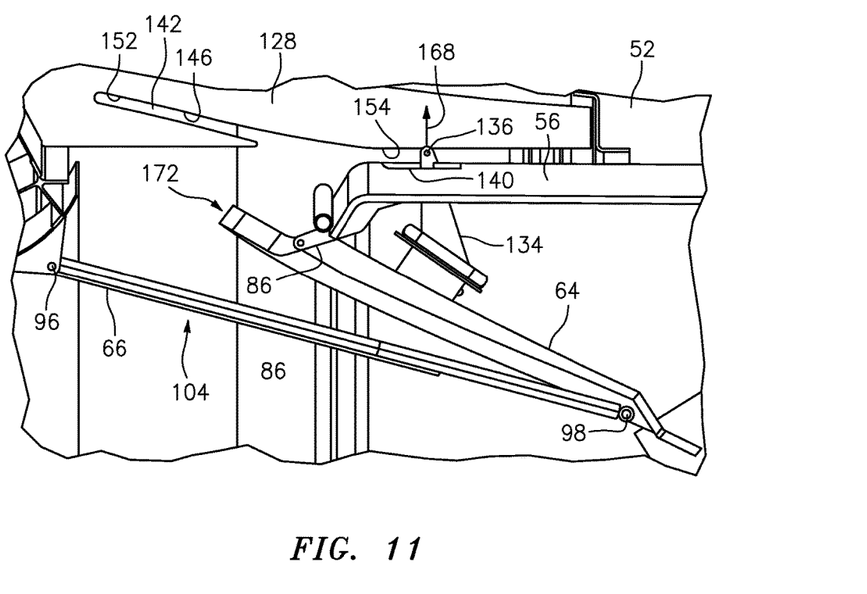
FIG. 11 is a partial cross section of the thrust reverser illustrating the blocker door being in an intermediate state.

With continued deployment of the thrust reverser 40, the roller 136 rolls rearward along the forward portion 152 of track 146 (see FIG. 10), then out of the opening 148 and upon the aft portion 154 of track 146 (see FIG. 11). The roller 136 continues to roll rearward upon the aft portion 154 and until the blocker door 64 reaches an intermediate state 172 (see FIG. 11). While the roller 136 is biased against, and rolls upon the aft portion 154, any substantial and continued withdrawal of the arm 134 from the aperture 140 may cease. At the intermediate state 172, the push rod 66 has reached the extended condition 104 and the stop 112 (see FIG. 8) is engaged.

With the stop 112 engaged, the biasing force 102 of the biasing member 94 is only exerted against the stop 112, thus the actuator 78 no longer needs to operate against this force (i.e. force 102 is an aiding force upon deployment) but must still overcome an increasing force produced by the bypass airflow against the blocker door 64. Generally at the intermediate state 172 and with the push rod 66 in the extended condition 104 the biasing force 102 is no longer exerted against the blocker door 64 and the radial component 168 of the force 102 becomes zero (i.e. ceases to exist). With the absence of the radial component 168 and with the continued rearward axial movement of the pressure sleeve 56 of the translating structure 52: the blocker door 64 continues to pivot out of the intermediate state 172 and toward the deployed state 70; the roller 136 lifts off of the aft portion 154 of the track 146 (i.e. the linkage 67 becomes disengaged); and then the arm 134 that carries the roller 136 moves out of the aperture 140 (i.e. the arm 134 no longer projects through the pressure sleeve 56). The actuator 78 continues to push the translating structure 52 rearward until the translating member reaches the aft position 76 placing the blocker door in the deployed state 70 and stabilized by the push rods 66 in the extended condition 104 with the linkage 67 disengaged (see FIG. 5).

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A thrust reverser comprising:
   a translating structure constructed and arranged to move between first and second positions;
   a blocker door pivotally engaged to the translating structure for pivotal movement between a first state when the translating structure is in the first position and a second state when the translating structure is in the second position;
   a stationary structure;
   a telescoping push rod engaged pivotally to and extending between the stationary structure and the blocker door for telescopic movement between retracted and extended conditions when the blocker door moves between the respective first and second states, wherein the telescoping push rod has a biasing member for biasing the telescoping push rod toward the extended condition, wherein the telescoping push rod is in the extended condition when the blocker door is in the second state, wherein the push rod includes a stop preventing further extension of the push rod; and
   a linkage orientated between the stationary structure and the blocker door;
   wherein the blocker door has an intermediate state orientated between the first and second states and the telescoping push rod is in the extended condition when the blocker door pivots between the intermediate state and the second state, and the telescoping push rod is in the retracted condition when the blocker door is in the first state and is extending from the retracted condition and into the extended condition when the blocker door is pivoting from the respective first state and into the intermediate state, and wherein the biasing member exerts a biasing force against the stop when the telescoping push rod is in the extended condition and exerts a component of the biasing force upon the linkage when the blocker door is at or between the first state and the intermediate state.

2. The thrust reverser set forth in claim 1, wherein the telescoping push rod includes first and second arms co-extending along a centerline and in sliding engagement with one another, and a first pivotal joint engaged to the stationary structure and the first arm and a second pivotal joint engaged to the blocker door and the second arm, and wherein the biasing member is a coiled spring compressed between an axial face carried by the first arm and an opposed axial face carried by the second arm.

3. A blocker door device for a thrust reverser having a translating structure, the blocker door device comprising:
   a stationary structure;
   a blocker door pivotally engaged to the translating structure;
   a passive linkage orientated between the stationary structure and the blocker door; and
   an extendable linkage engaged between the stationary structure and the blocker door, the extendable linkage extendable between a retracted condition and an extended condition;
   wherein the blocker door pivots between a stowed state and a deployed state, and when in the stowed state the extendable linkage is in the retracted condition, and when in the deployed state the extendable linkage is in the extended condition;
   wherein the extendable linkage is pivotally engaged between the stationary structure and the blocker door;
   wherein the blocker door has a first surface and a second surface that is opposite the first surface, the extendable linkage is orientated between the stationary structure and the first surface, and the passive linkage is orientated between the stationary structure and the second surface;
   wherein the extendable linkage is a telescoping push rod projecting outward from the first surface and the passive linkage has an arm rigidly engaged to and projecting outward from the second surface and to a distal head for contact upon the stationary structure;
   wherein the extendable linkage has a resilient biasing member for biasing the extendable linkage from the retracted condition and toward the extended condition; and
   wherein when in the stowed state the distal head is in contact with the stationary structure, and when in the deployed state the distal head is spaced from the stationary structure.

4. The thrust reverser of claim 1, further comprising a cascade of turning vanes configured to be between the translating structure and the stationary structure when the blocker door is in the second state.

5. The thrust reverser of claim 1, wherein the thrust reverser is configured for an aircraft propulsion system, and a surface of the blocker door is configured to form a radial outer peripheral portion of a flowpath within the aircraft propulsion system when the blocker door is in the first position.

6. A thrust reverser for an aircraft propulsion system comprising:
- a translating structure translatable between first and second positions;
- a blocker door pivotally mounted to the translating structure and configured to pivot between a first state when the translating structure is in the first position and a second state when the translating structure is in the second position, the blocker door further configured to form a peripheral portion of a bypass flowpath within the aircraft propulsion system when the blocker door is in the first position;
- a stationary structure;
- a telescoping push rod engaged pivotally to and extending between the stationary structure and the blocker door for telescopic movement between first and second conditions when the blocker door moves between the respective first and second states; and
- a linkage orientated between the stationary structure and the blocker door, wherein the linkage is connected to and projecting outward from a first side of the blocker door and the telescoping push rod is connected to and projecting outward from a second side of the blocker door that is opposite the first side of the blocker door, wherein the linkage engages a member of the stationary structure when the blocker door is in the first state, and wherein the linkage is disengaged from the member of the stationary structure when the blocker door is in the second state.

7. The thrust reverser of claim 6, wherein the first condition is a retracted condition and the second condition is an extended condition, and wherein the first state is a stowed state and the second state is a deployed state.

8. The thrust reverser of claim 6, wherein a surface of the blocker door defines a recess extending along the blocker door, and the recess is adapted to receive the telescoping push rod for storage when the blocker door is in the first state and when the telescoping push rod is in the first condition.

9. The blocker door device set forth in claim 3, wherein the first surface defines a recess extending along the blocker door, and the recess is adapted to receive the extendable linkage for storage when the blocker door is in the stowed state and when the extendable linkage is in the retracted condition.

10. The blocker door device set forth in claim 1, wherein a surface of the blocker door defines a recess extending along the blocker door, and the recess is adapted to receive the telescoping push rod for storage when the blocker door is in the first state and when the telescoping push rod is in the retracted condition.

* * * * *